US010048976B2

United States Patent
Ansari et al.

(10) Patent No.: US 10,048,976 B2
(45) Date of Patent: Aug. 14, 2018

(54) ALLOCATION OF VIRTUAL MACHINES TO PHYSICAL MACHINES THROUGH DOMINANT RESOURCE ASSISTED HEURISTICS

(71) Applicant: NEW JERSEY INSTITUTE OF TECHNOLOGY, Newark, NJ (US)

(72) Inventors: Nirwan Ansari, Montville, NJ (US); Yan Zhang, Harrison, NJ (US)

(73) Assignee: NEW JERSEY INSTITUTE OF TECHNOLOGY, Newark, NJ (US)

( * ) Notice: Subject to any disclaimer, the term of this patent is extended or adjusted under 35 U.S.C. 154(b) by 219 days.

(21) Appl. No.: 14/917,621

(22) PCT Filed: Nov. 29, 2013

(86) PCT No.: PCT/US2013/072516
§ 371 (c)(1),
(2) Date: Mar. 9, 2016

(87) PCT Pub. No.: WO2015/080752
PCT Pub. Date: Jun. 4, 2015

(65) Prior Publication Data
US 2016/0216991 A1 Jul. 28, 2016

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 9/5094* (2013.01); *G06F 2009/4557* (2013.01); *Y02D 10/22* (2018.01)

(58) Field of Classification Search
None
See application file for complete search history.

(56) References Cited

U.S. PATENT DOCUMENTS

| | | |
|---|---|---|
| 2009/0254919 A1 | 10/2009 | Jayaraman et al. |
| 2009/0276771 A1 | 11/2009 | Nickolov et al. |
| 2010/0043009 A1 | 2/2010 | Marchand |
| 2010/0047890 A1 | 2/2010 | Tracy et al. |

(Continued)

OTHER PUBLICATIONS

"Reducing data center power and energy consumption: Saving money and "going green"," White Paper, Unicorn Government Inc., pp. 16 (Aug. 2013).

(Continued)

*Primary Examiner* — Kenneth Tang (57) ABSTRACT

Technologies are generally described to allocation of virtual machines to physical machines through dominant resource assisted heuristics. According to some examples, multiple virtual machines (VMs) may be clustered to two or more unallocated VM clusters according to a dominant resource requirement associated with each of the VMs. The VMs may be sorted according to a size attribute associated with the dominant resource requirement. Multiple physical machines (PMs) may be sorted according to a power efficiency attribute associated with each of the PMs. One of the PMs may be selected from an ordered list of PMs based on the power efficiency attribute. One of the VMs may be selected from another ordered list of PMs based on the size attribute. The selected VM may then be allocated to the selected PM.

20 Claims, 6 Drawing Sheets

(56) References Cited

U.S. PATENT DOCUMENTS

| | | | | |
|---|---|---|---|---|
| 2010/0180275 | A1* | 7/2010 | Neogi | G06F 1/3203 718/1 |
| 2010/0306382 | A1* | 12/2010 | Cardosa | G06F 9/5044 709/226 |
| 2010/0306767 | A1 | 12/2010 | Dehaan | |
| 2012/0166644 | A1 | 6/2012 | Liu et al. | |
| 2014/0215073 | A1* | 7/2014 | Dow | H04L 67/10 709/226 |

OTHER PUBLICATIONS

"Report to Congress on Server and Data Center Energy Efficiency," U.S. Environmental Protection Agency, Public Law 109-431, Energy Star Program, pp. 133 (Aug. 2, 2007).
Barroso, L.A., and Holzle, U., "The Case for Energy-Proportional Computing," IEEE Computer Society, vol. 40, No. 12, pp. 33-37 (Dec. 2007).
Beloglazov, A. and Buyya, R., "Optimal Online Deterministic Algorithms and Adaptive Heuristics for Energy and Performance Efficient Dynamic Consolidation of Virtual Machines in Cloud Data Centers," Concurrency and Computation: Practice and Experience, vol. 24, Issue 13, pp. 1397-1420 (Sep. 2012).
Beloglazov, A., and Buyya, R., "Energy Efficient Resource Management in Virtualized Cloud Data Centers," 10th IEEE/ACM International Conference on Cluster, Cloud and Grid Computing (CCGrid), pp. 826-831 (May 17-20, 2010).
Beloglazov, A., et al., "Energy-aware resource allocation heuristics for efficient management of data centers for Cloud computing," Future Generation Computer Systems, vol. 28, Issue 5, pp. 755-768 (May 2012).
Caprara, A., and Toth, P., "Lower Bounds and Algorithms for the 2-Dimensional Vector Packing Problem," Discrete Applied Mathematics, vol. 111, Issue. 3, pp. 231-262 (Aug. 2001).
Ghodsi, A., "Dominant Resource Fairness: Fair Allocation of Multiple Resource Types," 8th USENIX conference on Networked Systems Design and Implementation (NSDI'11), pp. 323-336 (Mar. 30-Apr. 1, 2011).
Gong, Z., and Gu, X., "PAC: Pattern-driven Application Consolidation for Efficient Cloud Computing," IEEE International Symposium on Modeling, Analysis & Simulation of Computer and Telecommunication Systems (MASCOTS), pp. 24-33 (Aug. 17-19, 2010).
Gupta, A., et al., "HPC-Aware VM Placement in Infrastructure Clouds," IEEE International Conference on Cloud Engineering (IC2E), pp. 11-20 (Mar. 25-27, 2013).
Hlavacs, H., and Treutner, T., "Genetic algorithms for energy efficient virtualized data centers," 8th international conference and 2012 workshop on systems virtualiztion management (svm) Network and service management (cnsm), pp. 422-429 (Oct. 22-26, 2012).
Hou, E.S.H., et al., "A genetic algorithm for multiprocessor scheduling," IEEE Transactions on Parallel and Distributed Systems, vol. 5, Issue 2, pp. 113-120 (Feb. 1994).
International Search Report and Written Opinion for International Application No. PCT/US2013/072516, dated May 27, 2014.
Jin, H., "Host and Network Optimizations for Performance Enhancement and Energy Efficiency in Data Center Networks," FIU Electronic Theses and Dissertations, Paper 735, pp. 132 (Nov. 7, 2012).
Lee, S., "Validating Heuristics for Virtual Machines Consolidation," Microsoft, Tech. Rep. MSR-TR-2011-9, pp. 14 (Jan. 2011).
Marzolla, M., et al., "Server Consolidation in Clouds through Gossiping," IEEE International Symposium on a World of Wireless, Mobile and Multimedia Networks (WoWMoM), pp. 1-6 (Jun. 20-24, 2011).
Pelley, S., et al., , "Understanding and Abstracting Total Data Center Power," Proceedings of the 36th International Symposium on Computer Architecture (ISCA) Workshop on Energy Efficient Design (WEED), pp. 6 (2009).
Singh, A., et al., "Server-Storage Virtualization: Integration and Load Balancing in Data Centers," International Conference for High Performance Computing, Networking, Storage and Analysis, pp. 1-12 (Nov. 15-21, 2008).
Verma, A., et al., "pMapper: Power and Migration Cost Aware Application Placement in Virtualized Systems," Proceedings of the 9th ACM/IFIP/USENIX International Conference on Middleware, vol. 5346, pp. 243-264 (2008).
Wang, Y., and Wang, X., "Power Optimization with Performance Assurance for Multi-tier Applications in Virtualized Data Centers," 39th International Conference on Parallel Processing Workshops (ICPPW), pp. 512-519 (Sep. 13-16, 2010).
Wood, T., "Black-box and Gray-box Strategies for Virtual Machine Migration," 4th USENIX conference on Networked systems design and implementation (NSDI'07), pp. 14 (Apr. 11-13, 2007).
Wu, G., et al., "Energy-Efficient Virtual Machine Placement in Data Centers by Genetic Algorithm," Proceedings of the 19th international conference on Neural Information Processing—vol. Part III (ICONIP'12), pp. 315-323 (Nov. 12-15, 2012).
Wu, Y., "A simulated annealing algorithm for energy efficient virtual machine placement," IEEE International Conference on Systems, Man, and Cybernetics (SMC), pp. 1245-1250 (Oct. 14-17, 2012).
Xu, J., and Fortes, J.A.B. "Multi-Objective Virtual Machine Placement in Virtualized Data Center Environments," IEEE/ACM Int'l Conference on & Int'l Conference on Cyber, Physical and Social Computing (CPSCom) Green Computing and Communications (GreenCom), pp. 179-188 (Dec. 18-20, 2010).

* cited by examiner

COMPUTER PROGRAM PRODUCT 600

SIGNAL-BEARING MEDIUM 602

604 AT LEAST ONE OF

ONE OR MORE INSTRUCTIONS TO SORT A PLURALITY OF VMS ACCORDING TO A SIZE ATTRIBUTE ASSOCIATED WITH A DOMINANT RESOURCE REQUIREMENT;

ONE OR MORE INSTRUCTIONS TO SORT A PLURALITY OF PHYSICAL MACHINES (PMS) ACCORDING TO A POWER EFFICIENCY ATTRIBUTE ASSOCIATED WITH EACH OF THE PLURALITY OF PMS;

ONE OR MORE INSTRUCTIONS TO SELECT ONE OF THE PLURALITY OF PMS BASED ON THE POWER EFFICIENCY ATTRIBUTE;

ONE OR MORE INSTRUCTIONS TO SELECT ONE OF THE PLURALITY OF VMS BASED ON THE SIZE ATTRIBUTE; AND/OR     ONE OR MORE INSTRUCTIONS TO ALLOCATE THE SELECTED VM TO THE SELECTED PM.

| COMPUTER-READABLE MEDIUM 606 | RECORDABLE MEDIUM 608 | COMMUNICATIONS MEDIUM 610 |
|---|---|---|

FIG. 6

ALLOCATION OF VIRTUAL MACHINES TO PHYSICAL MACHINES THROUGH DOMINANT RESOURCE ASSISTED HEURISTICS

CROSS-REFERENCE TO RELATED APPLICATION

This Application is the U.S. National Stage filing under 35 U.S.C. § 371 of International Application No. PCT/US13/72516, filed on Nov. 29, 2013. International Application No. PCT/US13/72516 is herein incorporated by reference in its entirety.

BACKGROUND

Unless otherwise indicated herein, the materials described in this section are not prior art to the claims in this application and are not admitted to be prior art by inclusion in this section.

Rapid escalation of power consumption may be a concern issue for datacenters. Servers may be primary power consumers in a datacenter and so may contribute to a substantial portion of the overall power consumption. However, an average server utilization may be substantially below a maximum utilization threshold in the datacenter. Thus, a higher number of servers than needed may be operating at any given datacenter and so may cause excessive power consumption.)

Virtual machine (VM) consolidation may be an important technique for efficient usage of server resources and thereby reduce server power consumption. VM consolidation may reduce a total number of servers active at any given time. As such, VM consolidation may result in a reduction of power consumption of the datacenter. Typically, heterogeneity exists both among the VMs' resource requirements and among the servers resource capacities, which may degrade virtual machine consolidation performance or increase the computational complexity of the heuristic approaches to improve the virtual machine consolidation performance.

SUMMARY

The present disclosure generally describes methods, apparatus, systems, devices, and/or computer program products related to allocation of virtual machines to physical machines.

According to some examples, a method is provided to allocate virtual machines to physical machines through dominant resource assisted heuristics An example method may include sorting a plurality of virtual machines (VMs) according to a size attribute associated with a dominant resource requirement, sorting a plurality of physical machines (PMs) according to as power efficiency attribute associated with each of the plurality of PMs, and selecting one of the sorted plurality of PMs based on the power efficiency attribute. The method may also include selecting one of the sorted plurality of VMs based on the size attribute and allocating the selected VM to the selected PM.

According to other examples, an apparatus including a processor is provided to allocate virtual machines to physical machines through dominant resource assisted heuristics. The apparatus may include a communication module configured to communicate with a plurality of virtual machines (VMs) and a plurality of physical machines (PMs) at a datacenter, an allocation module configured to manage multiple virtual machines (VMS) and multiple physical machines (PMs), and a processor coupled to the allocation module. The processor may be configured to operate the allocation module to cluster the plurality of VMs to at least two unallocated VM clusters based on a dominant resource requirement associated with each of the plurality of VMs, sort the plurality of VMs according to a size attribute associated with the dominant resource requirement, sort the plurality of PMs according, to a power efficiency attribute associated with each of the plurality of PMs, select one of the plurality of PMs based on the power efficiency attribute, and select one of the plurality of VMs based on the size attribute. The allocation module may further allocate the selected VM to the selected PM and to convey the allocation to the selected VM and to the selected PM through the communication module and iterate through the two unallocated VM clusters to allocate each of the plurality of the VMs to at least one of the plurality of the PMS and to convey the allocation to each of the plurality of the VMs and to at least one of the plurality of the PMs through the communication module.

According to some examples, a system that includes a plurality of virtual machines (VMs), a plurality of physical machines (PMs), and a controller communicatively coupled to the VMs and PMs is described. The controller may be configured to allocate the VMs to the PMs through dominant resource assisted heuristics. As such, the controller may be configured to perform or cause to be performed cluster the plurality of VMs to at least two unallocated VM clusters according to a dominant resource requirement associated with each of the plurality of VMs, order the plurality of VMs according to a size attribute associated with the dominant resource requirement, order the plurality of PMs according to a power efficiency attribute associated with each of the plurality of PMs, select one of the plurality of PMs, where the selected PM is ordered at a first identifiable position based on the power efficiency attribute, and select one of the plurality of VMs, where the selected VM is ordered at a second identifiable position based on the size attribute. The controller may also be configured to perform or cause to be performed activate a server that includes the selected PM, allocate the selected VM to the activated server, and iterate through the two unallocated VM clusters to allocate each of the plurality of the VMs to one or more servers.

According to some examples, a computer readable medium may store instructions to allocate virtual machines to physical machines through dominant resource assisted heuristics. The instructions may cause a method to be performed when executed, as described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing, from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices and/or computer program products related to allocation of virtual machines to physical machines through dominant resource assisted heuristics.

Briefly stated, technologies are directed to allocation of virtual machines to physical machines through, for example, dominant resource assisted heuristics. Multiple virtual machines (VMs) may be clustered to two or more unallocated VM clusters according to the dominant resource requirement associated with each of the VMs. The VMs may be sorted according to a size attribute associated with the dominant resource requirement. Multiple physical machines (PMs) may be sorted according to a power efficiency attribute associated with each of the PMs. One of the PMs may be selected from an ordered list of PMs based on the power efficiency attribute. One of the VMs may be selected from another ordered list of PMs based on the size attribute. The selected VM may then be allocated to the selected PM.

Figure 1:
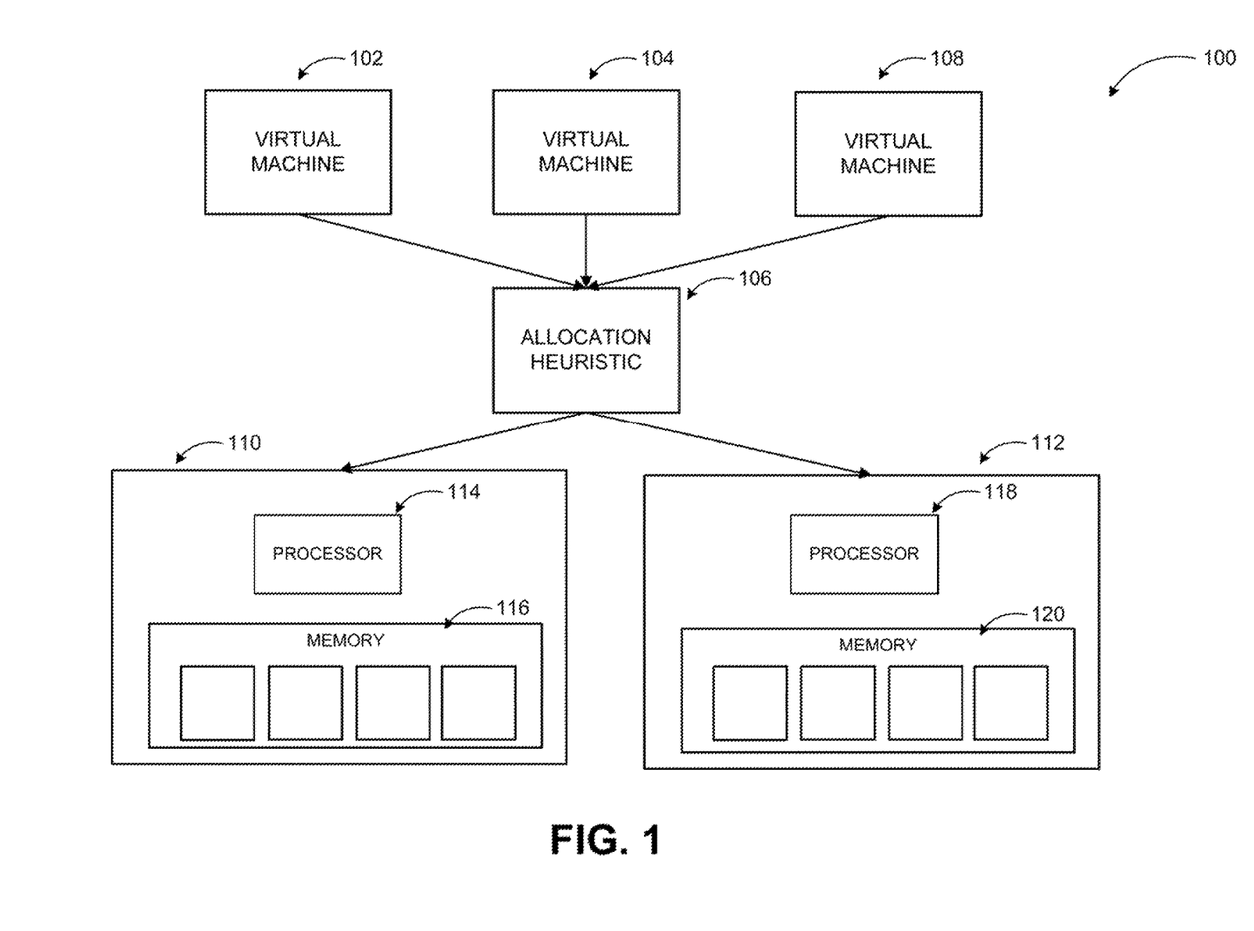
FIG. 1 illustrates an example schema to allocate virtual machines to physical machines through dominant resource assisted heuristics.

FIG. 1 illustrates an example schema to allocate virtual machines to physical machines through dominant resource assisted heuristics, arranged in accordance with at least some embodiments described herein.

As depicted, a diagram 100 shows components of a schema to allocate VMs to PMs through dominant resource assisted heuristics. Diagram 100 includes an allocation heuristic module 106 configured to analyze VMs 102, 104, and 108 based on a resource such as a size attribute. The allocation heuristic module 106 may be implemented as software, hardware, or a combination of software and hardware. The size attribute may include one or more of a weighted resource demand value, a weighted resource capacity value, a weighted sum value of a normalized resource demand, a weighted sum value of a normalized resource capacity, a product of the normalized resource demand, a product of the normalized resource capacity, or other parameters associated with a VM. The allocation heuristic module 106 may also analyze PMs 110 and 112 based on a resource such as a power efficiency attribute. The power efficiency attribute may be analyzed based on a processor 114 and a memory 116 of the PM 110 and a processor 118 and a memory 120 of the PM 112. The allocation heuristic module 106 may analyze processor capacities associated with the processors 116 and 118 and memory capacities associated with the memories 116 and 120. The allocation heuristic module 106 may allocate the VMs 102, 104, and 108 to the PMs 110 and 112 based on the analysis. Processors 114 and 118 may be single core or multicore. Memories 116 and 120 may be implemented in a variety of ways such as distinct memory blocks as shown in the figure). The allocation heuristic module 106 may be implemented in a standalone network device, in distributed network devices, in some other PM in addition to the PMs 110 and 112, and even within one or both of the PMs 110 and 112, and/or in any other configuration or device having the capability to communicate with the PMs 110 and the VMs 102, 104, and 108.

Consolidation of multiple VMs may be achieved through a process to reduce a number of active servers at a datacenter with constraints imposed by server capacities, service level agreements, or other constraint aspects. In an example scenario, K VMs $\{V_1 \ldots V_k\}$, associated with customers, may be assigned to the datacenter hosting M distinct PMs $\{M_i\}(i \in [1, M])$, where K and M are integers greater than or equal to 1. Each PM, $M_i$, may be identified by to d-dimensional resource capacity vector $C_i=[C_{i1}, \ldots, C_{id}](i \in [1, M])$. Each dimension, $C_{i,j}$, may correspond to a resource such as a processor (CPU), a memory, a network bandwidth, as storage capacity, or other resources.

Each VM may be defined by a d-dimensional resource request vector $R_k=[r_{k1}, \ldots, r_{kd}]$, where $r_{kj}(j \in [1, d])$ may be the VM $V_k$'s resource demand for dimension j. A VM consolidation heuristic may determine how to allocate the K VMs on M PMs, designated by $x_{ij}=\{0,1\}(i \in [1, K], j \in [1, M])$. The variable $x_{ij}$ may be a binary variable indicating whether the VM $V_i$ may be assigned to PM $M_j$. If the VM $V_i$ is assigned to PM $M_j$, $x_{ij}=1$ otherwise $x_{ij}=0$.

A goal of the VM consolidation heuristic may be to place the VMs on a minimum or otherwise relatively lower number of active PMs. The VM consolidation heuristic may also enforce allocation of total resource demands of VMs on active PMs, while not exceeding resource capacities of the PMs in any dimension. If PM $M_j$ is assigned one or more VMs, the PM $M_j$ may be determined to be active, $y_j=1$. Otherwise, PM $M_j$ may be assumed to be at an idle state, $y_j=0$. As such, an objective function of the VM consolidation heuristic may be to reduce a total number of active PMs as: min $\Sigma_{j=1}^{M} y_j$. The objective function may be subject to resource capacity constraints, where for each resource of PM $M_j$, a total quantity utilized by VMs allocated to the PM may not exceed the PM's resource capacity weighted by the PM's maximum resource utilization factor $\gamma_{ij}(k \in [1, d]))$. $\Sigma_{i=1}^{K} r_{ik}x_{ij} \leq \gamma_{jk}C_{jk}$ ($\forall k \in [1, d]$). The objective function may also be subject to a placement guarantee constraint, where each VM may be assigned to one PM. $\Sigma_{j=1}^{M} x_{ij}=1$. The objective function may further be subject to a correlation between as binary status of PMs, $y_j$, with VMs allocation $x_{ij}$ in which for each PM $M_j$, $M_j$'s binary status $y_j$ may be smaller than a binary allocation status of VM $V_i$ allocated to PM $M_j$ $x_{ij}$, since any one of the VM $V_i$ may be assigned to PM $M_j$ to result in $y_j=1$. $\gamma_j \geq x_{ij}(\forall i \in [1, K], \forall j \in [1, M])$.

Figure 2:
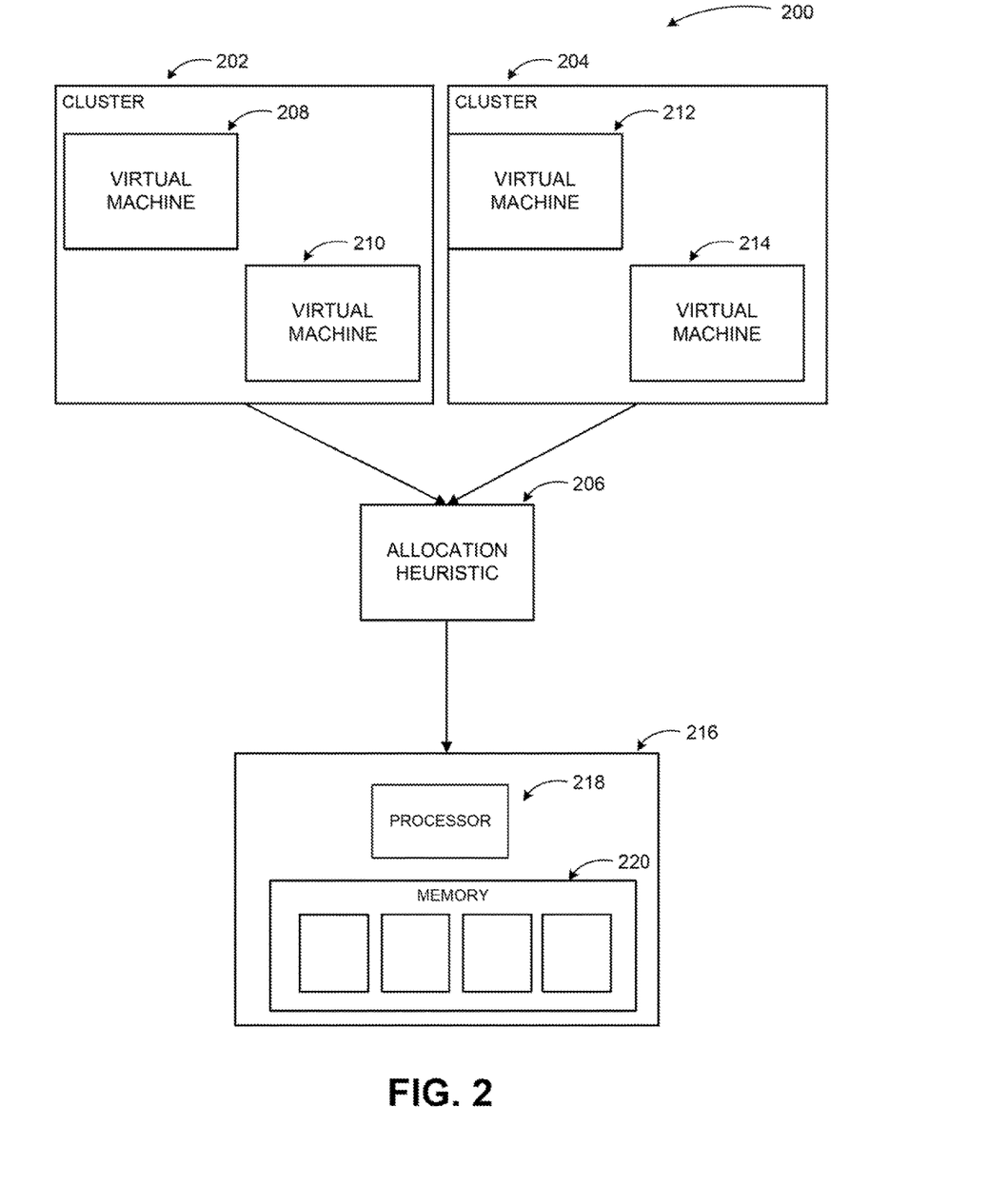
FIG. 2 illustrates example components of a schema to allocate virtual machines to physical machines through dominant resource assisted heuristics.

FIG. 2 illustrates example components of a schema to allocate virtual machines to physical machines through dominant resource assisted heuristics, arranged in accordance with at least some embodiments described herein.

As depicted, a diagram 200 shows an allocation heuristic module 206 (which may be similar as the allocation heuristic module 106) clustering VMs 208, 210, 212, and 214 to clusters 202 and 204. The allocation heuristic module 206 may cluster the VMs 208, 210, 212, and 214 based on a dominant resource based classification associated with the VMs 208, 210, 212, and 214. An example of a dominant resource based classification may include a processor intensive VM, a memory intensive VM, and other ones. Next, the allocation heuristic module 206 may assign VMs in the clusters 202 and 204 to PM 216 based on resources available at the PM 216 including a processor 218, a memory 220, or other resources.

In an example scenario, a first fit decreasing (FFD) heuristic derivative designated as a dominant resource requirement aware FFD may allocate virtual machines to physical machines based on dominant resource requirements. Dominant resource requirement FFD may be implemented by the allocation heuristic module 206, and dominant resource requirement FFD may attempt to balance resource utilization across all dimensions by matching a PM's residual resource capacity with a VM to be allocated. In an example, if available processor resource of the PM is more than available memory resource of the same PM, a processor intensive VM may be allocated to consume the additional CPU resource instead of the memory resource of the PM. The dominant resource requirement FFD heuristic is summarized in computation flow (1) below.

In contrast to FFD, dominant resource requirement FFD may cluster VMs based on their dominant resources. The dominant resources may correspond to largest resource demands in the VMs' normalized d-dimensional resource request vectors (line 1 in computation flow (1)). Dominant resource requirement FFD may sort PMs in non-increasing order of power efficiency to enforce assignment of the VMs to a subset of PMs with high power efficiency or highest power efficiency in order to reduce power consumption (line 3 in computation flow (1)). Dominant resource requirement FFD may start, for example, with a largest VM from the ranked VMs based on a size attribute associated with dominant resource(s) (line 4 in computation flow (1)). Dominant resource requirement FFD may assign the largest VM to a first PM, which may have sufficient residual resource capacity to host the VM until all VMs have been allocated (lines 5-8 in computation flow (1)).

Computation Flow (1) Dominant Resource Requirement FFD Heuristic

1: Cluster VMs by their dominant resources $\{G_1, ... , G_d\}$.
2: In each cluster, sort VMs in non-increasing size.
3: Sort PMs in the non-increasing order of the power efficiency.
4: Activate the most power efficient PM and assign the largest VM to it.
5: while not All VMs have been allocated do
6:   Calculate the total residual capacity $\{\Sigma_j y_i h_{j1}, ... , \Sigma_j y_i h_{jd}\}$ and identify the dominant residual capacity vector $\{D_1^R, ... , D_d^R\}$.
7:   Allocate the largest unassigned VM in the non-increasing order of the identified dominant residual capacity vector $\{D_1^R, ... , D_d^R\}$ with FFD heuristic.
8: end while One difference between FFD and dominant resource requirement FFD is that FFD may sort VMs in a single queue according the their sizes, while dominant resource requirement FFD may organize VMs into multiple groups $\{G_1, ... , G_d\}$ based on dominant resources. Dominant resource requirement FFD may provide a mechanism to determine a next unassigned VM to be allocated. Dominant resource requirement FFD may compute a total normalized residual resource capacity of active PMs across all dimensions and identify a dominant resource vector $\{D_1^R, ... , D_d^R\}$. Dominant resource requirement FFD may organize the resources based on non-increasing order of residual resource capacities. In an example scenario, the total normalized residual resource capacity of the active PMs may be [0.2, 0.6] in a processor and a memory, respectively. As such, the dominant resource requirement vector may be [memory, processor]. Then, dominant resource requirement FFD may select the largest or otherwise relatively higher unassigned VM in a cluster, which has a largest or otherwise relatively higher residual capacity. If an unassigned VM cannot be found in the cluster, dominant resource requirement FFD may search for another cluster with a next largest residual capacity. Dominant resource requirement FFD may iterate through multiple clusters until dominant resource requirement FFD locates a VM to be allocated. In addition, dominant resource requirement FFD may attempt to search a cluster that includes memory intensive VM, initially. If the cluster is determined to be empty, then dominant resource requirement FFD may attempt to search a cluster that includes processor intensive VMs.

Figure 3:
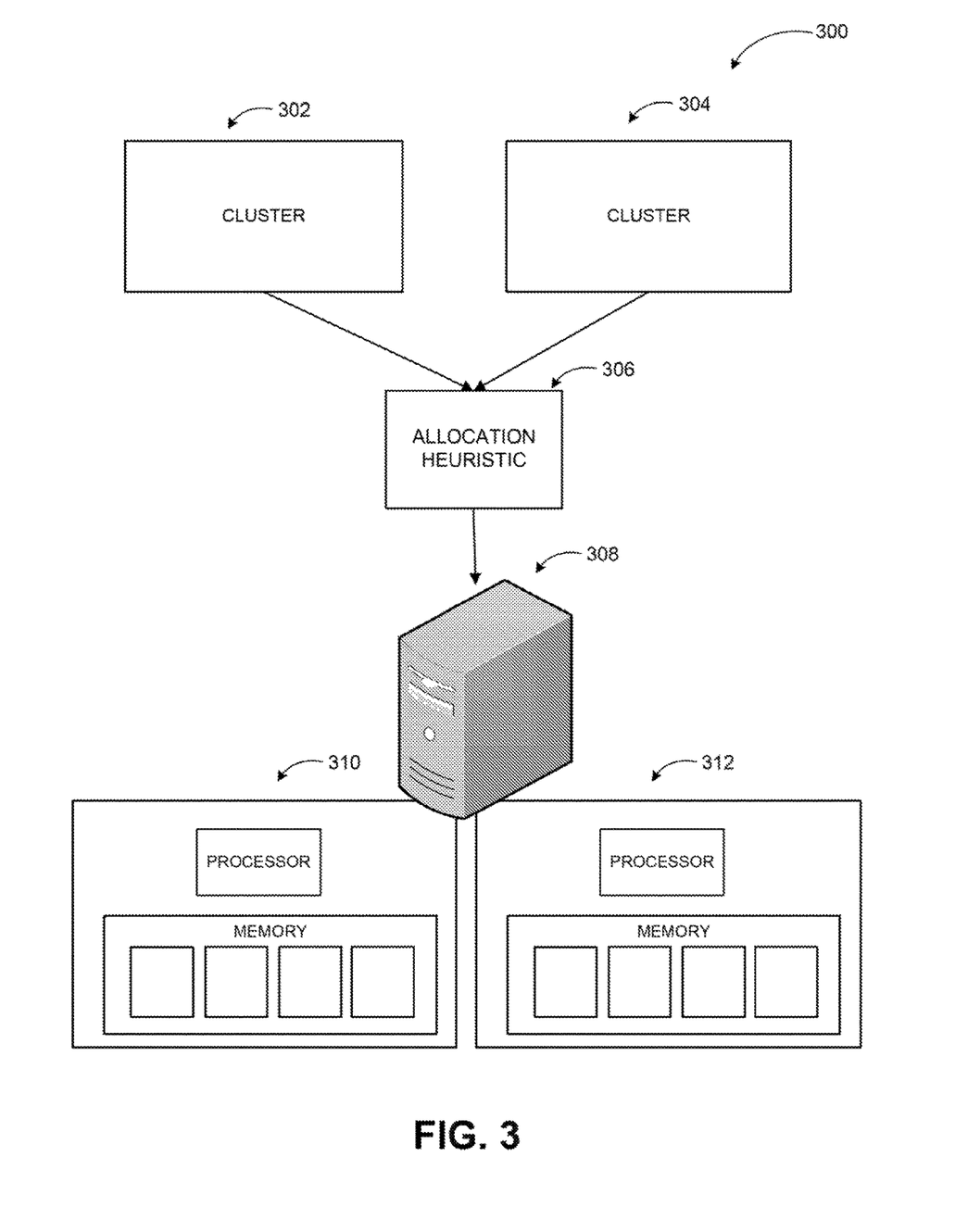
FIG. 3 illustrates an example schema to allocate virtual machines to physical machines through dominant resource assisted heuristics.

FIG. 3 illustrates an example schema to allocate virtual machines to physical machines through dominant resource skied heuristics, arranged in accordance with at least some embodiments described herein.

As depicted, a diagram 300 shows the allocation heuristic module 306 (which may be similar to the allocation heuristic modules 106 and 206) allocating VMs in clusters 302 and 304 to a server 308. The server 308 may include PMs 310 and 312 with their respective processors and memories. The allocation heuristic module 306 may analyze dominant resource requirement of VMs in the clusters 302 and 304 to allocate the VMs to PMs 310 and 312 in the server 308 base on residual resource capacity of the PMs 310 and 312.

A potential challenge with dominant resource requirement FFD in some scenarios ma be that a sum of residual capacities across active PMs may mislead a dominant resource requirement. In an example scenario, four of five active PMs may have a normalized residual resource capacity of [0.15 processor, 0 memory]. A fifth PM may have a residual resource capacity of [0.3 processor, 0.5 memory]. As such, a total residual capacity of the five PMs is [0.9 processor, 0.5 memory]. Dominant resource requirement FFD may select a CPU intensive VM to be allocated based on the total residual capacity. However, based on the normalized residual capacity, 80% of the active PMs may not be assigned to any VM because of lack of memory to satisfy a resource capacity constraint. In addition, a utilization of the processor resource may be higher than that of the memory resource on the fifth PM. Allocation of another processor intensive VM to the fifth PM may worsen an imbalance of resource utilization. Utilization of the residual capacity of each individual PM by the allocation heuristic module 306 to identify a dominant residual vector may resolve the imbalance. Consideration of the individual PM to allocate VMs to PMs through dominant resource requirement FFD may be referred to as individual dominant resource requirement FFD (iDRR-FFD), and the allocation heuristic module 306 may use iDRR-FFD accordingly.

According to some embodiments, a dominant resource requirement based bin fill (DRR-BinFill) heuristic may be used (by one or more of the aforementioned allocation heuristic modules 106, 206, 306) to allocate VMs to servers. The DRR-BinFill heuristic is summarized in computation flow (2) below. In an example, DRR-BinFill heuristic may cluster VMs according to their dominant resources. The DRR-BinFill may sort the VMs in a non-increasing size (lines 1 and 2 in computation flow (2)). The idle PMs in a server may be activated in non-increasing order of their energy efficiency to enforce allocation of the VMs to a subset of PMs with relatively higher power efficiency or highest power efficiency to reduce power consumption (line 3 in computation flow (2)). In some cases, the activated server may not be empty (no VM assignment). If the server is empty, the largest or relatively larger VM may be allocated to the server (line 6, computation flow (2)). Otherwise, the allocation may be skipped. Next, DRR-BinFill may iteratively allocate one VM from unassigned VMs to the server to compensate for the server's residual resource capacity.

In each iteration, DRR-BinFill may compute the server's residual capacity and identify a dominant residual capacity vector (line 9 in computation flow (2)). DRR-BinFill may search for VM clusters in an order of the server's dominant residual capacity vector (line 13 in computation flow (2)). A relatively larger residual resource capacity of the server may indicate an earlier search associated with a VM cluster. VM searching scheme may be stopped when one VM is located without violating the server's capacity constraints. If all clusters have been searched and the VM is located (lines 14-16 in computation flow (2)), or some resources in the server have reached their capacity constraints (lines 10-12 in computation flow (2)), DRR-BinFill may be stopped.

Computation Flow (2) Dominant Resource Requirement Based Bin Fill

---

1: Cluster VMs by their dominant resources $\{G_1, \ldots, G_d\}$.
2: In each cluster, sort VMs in non-increasing size.
3: Sort PMs in the non-increasing order of the power efficiency.
4: while not All VMs has been allocated do
5:     Activate the most energy efficient idle server $M_i$.
6:     Allocate the largest unassigned VM to $M_i$.
7:     Comment: The following is the Bin Filling Process.
8:     while not Filling process finished do
9:         Calculate the server's residual capacity $h_j (j \in [1, d]$ and identify the dominant residual capacity vector $\{D_1^R, \ldots, D_d^R\}$.
10:        if the residual capacity of one resource is smaller than $\in$ then
11:            break; //bin filling process finishes.
12:        end if
13:        Search for the clusters corresponding to the order of dominant residual capacity vector $\{D_1^R, \ldots, D_d^R\}$ to get a VM to be allocated to the $PMM_i$ without violating the resource capacity constraints.
14:        if Such a VM cannot be found then
15:            break; //bin filling process finishes.
16:        end if
17:    end while
18: end while

---

Embodiments may be implemented via hardware, software, and/or combinations of hardware and software components. The software components may operate with communication or signaling systems, to allocate virtual machines to physical machines through dominant resource assisted heuristics.

While embodiments have been discussed above using specific examples, components, scenarios, and configurations in FIG. 1, FIG. 2, and FIG. 3 they are intended to provide a general guideline to be used to allocate virtual machines to physical machines through dominant resource assisted heuristics. These examples do not constitute a limitation on the embodiments, which may be implemented using other components, optimization schemes, and configurations using the principles described herein. For example, other approaches may be implemented than those provided as example.

Figure 4:
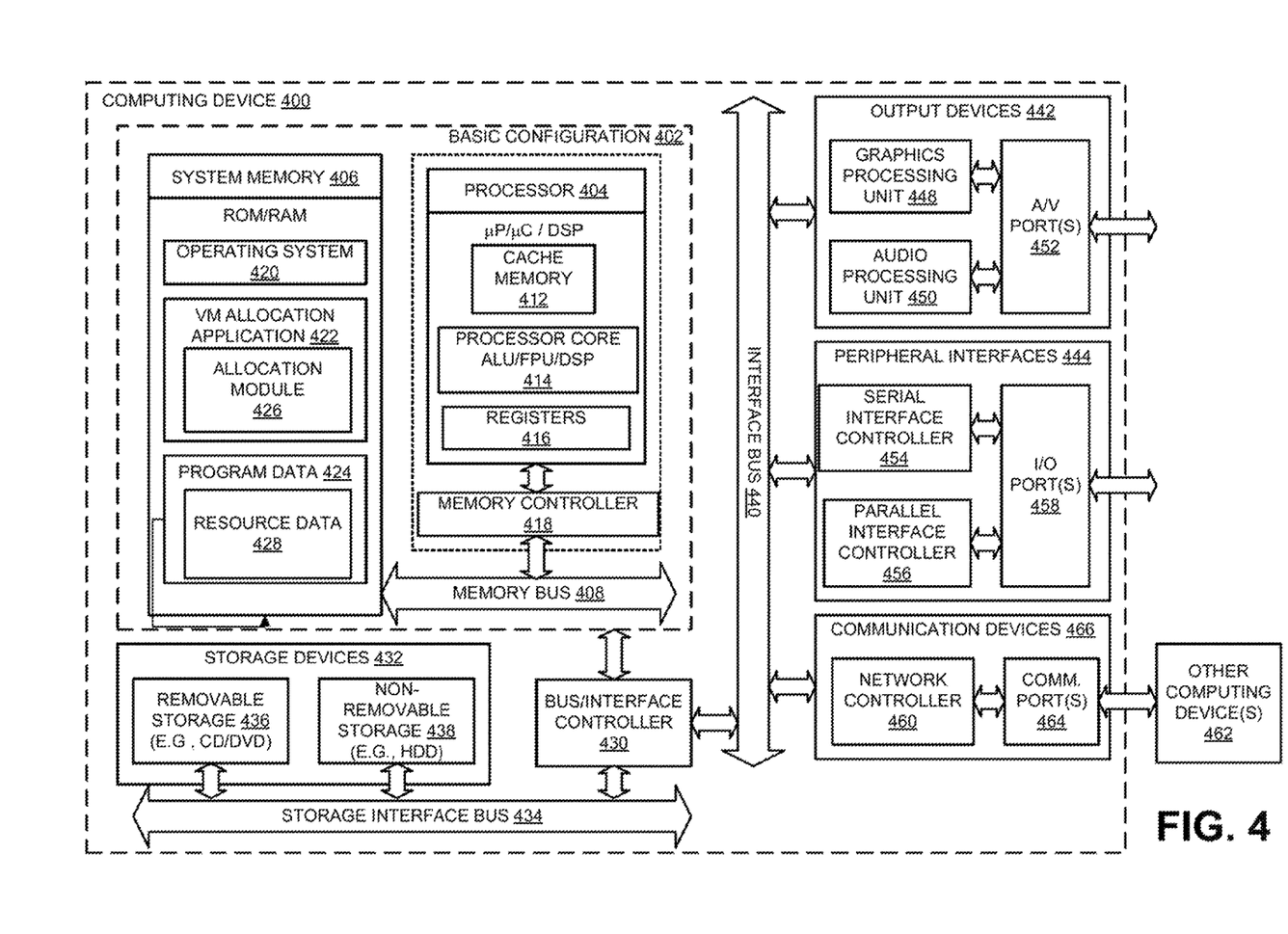
FIG. 4 illustrates an example computing device, which may be used to allocate virtual machines to physical machines through dominant resource assisted heuristics.

FIG. 4 illustrates a computing device, which may be used to allocate virtual machines to physical machines through. The example, dominant resource assisted heuristics, arranged in accordance with at least some embodiments described herein. The computing device 400 of FIG. 4 may be a device configured to execute or otherwise provide the features of an allocation heuristic module 106, 206 and 306. In a very basic configuration 402, computing device 400 typically includes one or more processors 404 and a system memory 406. A memory bus 408 may be used for communicating between processor 404 and system memory 406.

Depending on a particular configuration, processor 404 may be of any type including but not limited to a microprocessor (μP), a microcontroller (μC), a Digital Signal Processor (DSP), or any combination thereof. Processor 404 may include one more levels of caching, such as a level cache memory 412, a processor core 414, and registers 416. Example processor core 414 may include an Arithmetic Logic Unit (ALU), a floating point unit (FPU), a Digital Signal Processing core (DSP Core), or any combination thereof. An example memory controller 418 may also be used with processor 404, or in some implementations, memory controller 414 may be an internal part of processor 404.

Depending on the particular configuration, system memory 406 may be of any type including but not limited to volatile memory (such as RAM), non-volatile memory (such as ROM, flash memory, etc.) or any combination thereof. System memory 406 may include an operating system 420, a VM allocation application 422, and program data 424. The VM allocation application 422 may include one or more allocation module 426 (which may embody one or more of the previously described allocation heuristic module 106, 206, and 306) that is arranged to allocate virtual machines to physical machines through dominant resource assisted heuristics. Program data 424 may include one or more resource data 428 and other data as discussed above in conjunction with at least FIGS. 1, 2, and 3. This data may be useful for allocation of virtual machines to physical machines through dominant resource assisted heuristics as is described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and Hard-Disk Drives (HDDs), optical disk drives such as Compact Disk (CD) drives or Digital Versatile Disk (DVD) drives, Solid State Drives (SSDs), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store information and which may be accessed by computing device 400. Any such computer storage media may be part of computing device 400.

Computing device 400 may also include an interface bus 440 for facilitating communication from various interface devices (for example, output devices 442, peripheral interfaces 444, and communication devices 466 to basic configuration 402 via bus/interface controller 430. Example output devices 442 include a graphics processing unit 448 and an audio processing unit 440, which may be configured to communicate to various external devices such as a display or speakers via one or more A/V ports 442. Example peripheral interfaces 444 include a serial interface controller 444 or a parallel interface controller 446, which may be configured to communicate with external devices such as input devices (for example, keyboard, mouse, pen, voice input device, touch input device, etc.) or other peripheral devices (for example, printer, scanner, etc.) via one or more I/O ports 448. An example communication device 466 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a physical server, virtual server, a computing cloud, or a hybrid device or any other suitable electronic device that includes any of the above functions. Computing device 400 may also be implemented as a personal computer including both laptop computer and non-laptop computer configurations. Moreover, computing device 400 may be implemented as a networked system or as part of a general purpose or specialized server.

Networks for a networked system including computing device 400 may comprise any topology of servers, clients, switches, routers, modems, Internet service providers, and any appropriate communication media (for example, wired or wireless communications). A system according to embodiments may have a static or dynamic network topology. The networks may include a secure network such as an enterprise network (for example, a LAN, WAN, or WLAN), an unsecure network such as a wireless open network for example, IEEE 802.11 wireless networks), or a world-wide network such (for example, the Internet). The networks may also comprise a plurality of distinct networks that are adapted to operate together. Such networks are configured to provide communication between the nodes described herein. By way of example, and not limitation, these networks may include wireless media such as acoustic, RE, infrared and other wireless media. Furthermore, the networks may be portions of the same network or separate networks.

Figure 5:
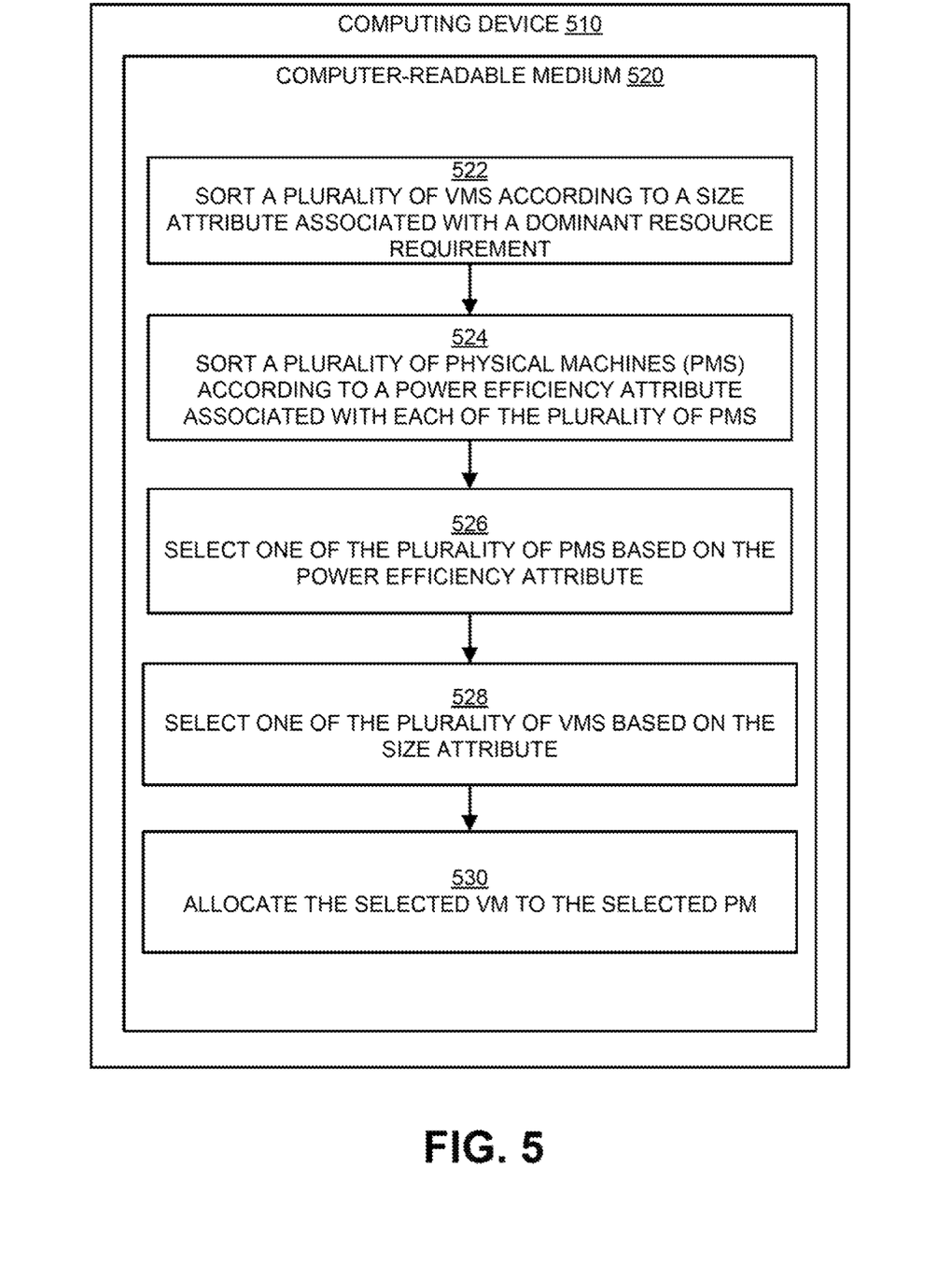
FIG. 5 is a now diagram illustrating an example method to allocate virtual machines to physical machines through dominant resource assisted heuristics.

FIG. 5 is a flow diagram illustrating an example method to allocate virtual machines to physical machines through dominant resource assisted heuristics that may be performed by a computing device 510, such as the computing device 400 in FIG. 4, arranged in accordance with at least some embodiments described herein.

Thus, computing device 510 may be embodied as computing device 400, or similar devices executing instructions stored in a non-transitory computer-readable medium 520 for performing the method. A process to allocate virtual machines to physical machines through dominant resource assisted heuristics may include one or more operations, functions or actions as is illustrated by one or more of blocks 522, 524, 526, 528, and/or 530.

Some example processes may begin with operation 522, "SORT A PLURALITY OF VMS ACCORDING TO A SIZE ATTRIBUTE ASSOCIATED WITH A DOMINANT RESOURCE REQUIREMENT." At operation 522, the computing device 400 may order the VMs based on multitude of resource-based attributes such as processor intensity, memory intensity, and other attributes forming a size attribute.

Operation 522 may be followed by operation 524, "SORT A PLURALITY OF PHYSICAL MACHINES (PTAs) ACCORDING TO A POWER EFFICIENCY ATTRIBUTE ASSOCIATED WITH EACH OF THE PLURALITY OF PMs." At operation 524, the computing device 400 may order the PMs based on power efficiency attribute.

Operation 524 may be followed by operation 526, "SELECT ONE OF THE PLURALITY OF PMs BASED ON THE POWER EFFICIENCY ATTRIBUTE." At operation 526, the computing device 400 may select a top or relatively higher power efficient PM.

Operation 526 may be followed by operation 528, "SELECT ONE OF THE PLURALITY OF VMs BASED ON THE SIZE ATTRIBUTE." At operation 528, the computing device 400 may select a top or relatively larger size VM.

Operation 528 may be followed by operation 530, "ALLOCATE THE SELECTED VM TO THE SELECTED PM." At operation 530, the computing device 400 may assign the top (or relatively larger) size VM to the top (or relatively higher) power efficient PM.

Figure 6:
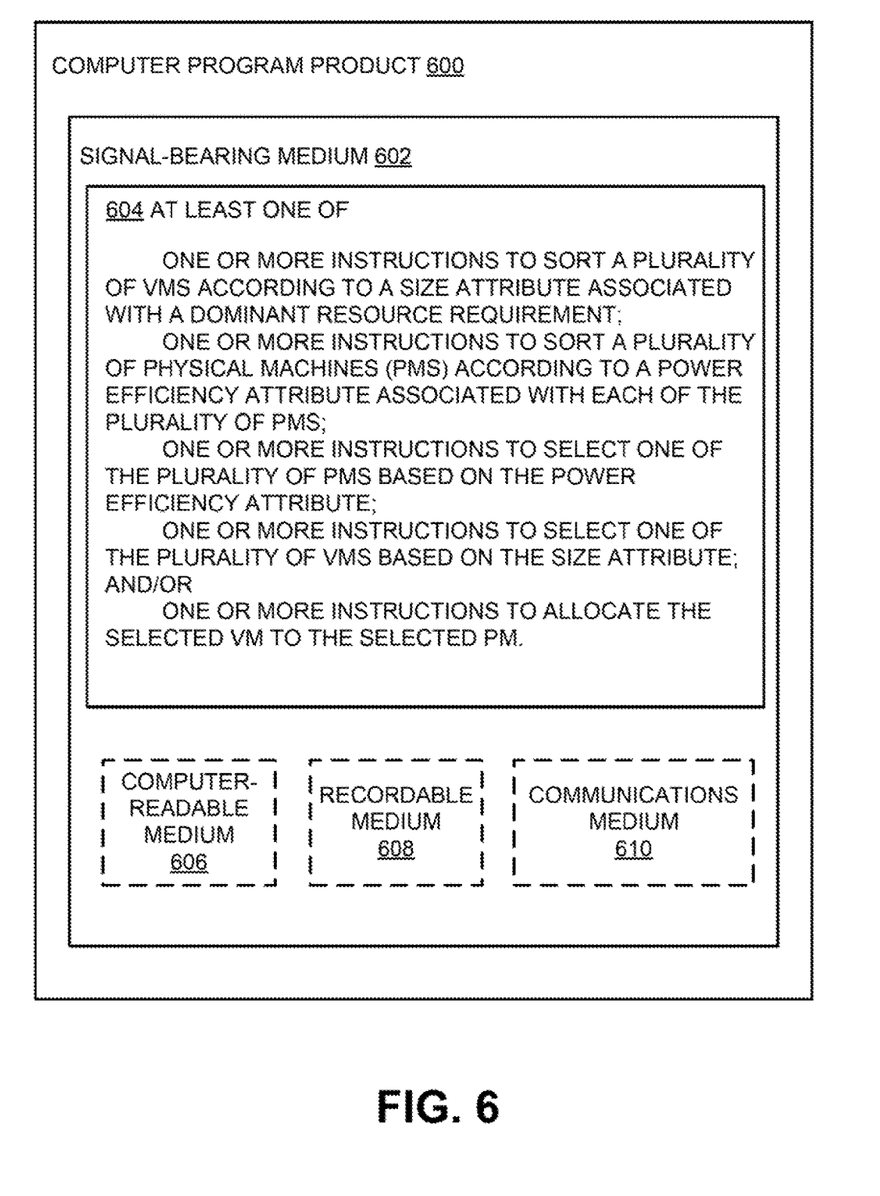
FIG. 6 illustrates a block diagram of an example computer program product to allocate virtual machines to physical machines through dominant resource assisted heuristics, all arranged in accordance with at least some embodiments described herein.

FIG. 6 illustrates a block diagram of an example computer program product to allocate virtual machines to physical machines through dominant resource assisted heuristics, arranged in accordance with some embodiments herein.

In some examples, as shown in FIG. 6, computer program product 600 may include a signal bearing medium 602 that may also include machine readable instructions 604 that, in response to execution by, for example, a processor, may provide the functionality described above with respect to FIG. 1 through FIG. 5. Thus, for example, referring to computing device 400, one or more of the tasks shown in FIG. 6 may be undertaken in response to instructions 604 conveyed to the computing device 400 by medium 602 to perform actions associated with allocation of virtual machines to physical machines through dominant resource assisted heuristics as described herein. Some of those instructions may include sorting a plurality of VMs according to a size attribute associated with the dominant resource requirement, sorting a plurality of physical machines (PMs) according to a power efficiency attribute associated with each of the plurality of PMs, selecting one of the plurality of PMs based on the power efficiency attribute, selecting one of the plurality of VMs based on the size attribute, and/or allocating the selected VM to the selected PM.

In some implementations, signal bearing medium 602 depicted in FIG. 6 may encompass a non-transitory computer-readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (for example, a fiber optic cable, a waveguide, a wired communications link, a wireless communication link, etc.). Thus, for example, computer program product 600 may be conveyed to the processor 604 by an RF signal bearing medium 602, where the signal bearing medium 602 is conveyed by a wireless communications medium 610 (for example, a wireless communications medium conforming with the IEEE 802.11 standard).

According to some examples, a method is provided to allocate virtual machines to physical machines through dominant resource assisted heuristics An example method may include sorting a plurality of virtual machines (VMs) according to a size attribute associated with a dominant resource requirement, sorting a plurality of physical machines (PMs) according to a power efficiency attribute associated with each of the plurality of PMs, and selecting one of the sorted plurality of PMs based on the power efficiency attribute. The method may also include selecting one of the sorted plurality of VMs based on the size attribute and allocating the selected VM to the selected PM.

According to other examples, the method may further include clustering the VMs to at least two unallocated VM clusters based on the dominant resource requirement and iterating through the two unallocated VM clusters to allocate each of the plurality of the VMs to at least one of the plurality of the PMs. The method may also include computing a total residual capacity attribute of the plurality of PMs, identifying a dominant resource requirement vector from the total residual capacity attribute, and sorting the plurality of PMs according to the dominant resource requirement vector. The dominant resource requirement vector may represent a memory capacity or a processor capacity.

According to further examples, the method may further include selecting another VM from the plurality of VMs, where the another VM is sorted at a top position based on the size attribute associated with each of the plurality of VMs; selecting another PM from the plurality of PMs, where the another PM is sorted at a top position based on the dominant resource requirement vector; and allocating the another VM to the another PM. The at least two VM clusters may include a memory intensive VM cluster and a processor intensive VM cluster. The dominant resource requirement may include a memory resource attribute and a processor resource attribute.

According to yet other examples, the size attribute may include at least one from a set of: a weighted resource demand value, a weighted resource capacity value, a weighted sum value of a normalized resource demand, a weighted sum value of a normalized resource capacity, a product of the normalized resource demand, and a product of the normalized resource capacity. The method may also include utilizing a dot product scheme to determine the selected VM, where the dot product scheme allocates the selected VM to maximize a dot product value and to not exceed a capacity constraint of the selected PM. The method may further include utilizing a norm-based greedy scheme to determine the selected VM, where the norm-based greedy scheme minimizes a weighted norm distance value between a resource request vector of the selected VM and a residual capacity vector of the selected PM to not exceed a capacity constraint of the selected PM.

According to other examples, an apparatus including a processor is provided to allocate virtual machines to physical machines through dominant resource assisted heuristics. The apparatus may include a communication module configured to communicate with a plurality of virtual machines (VMs) and a plurality of physical machines (PMs) at a datacenter, an allocation module configured to manage multiple virtual machines (VMs) and multiple physical machines (PMs), and a processor coupled to the allocation module. The processor may be configured to operate the allocation module to cluster the plurality of VMs to at least two unallocated VM clusters based on a dominant resource requirement associated with each of the plurality of VMs, sort the plurality of VMs according to a size attribute associated with the dominant resource requirement, sort the plurality of PMs according m a power efficiency attribute associated with each of the plurality of PMs, select one of the plurality of PMs based on the power efficiency attribute, and select one of the plurality of VMs based on the size attribute. The allocation module may further allocate the selected VM to the selected PM and to convey the allocation to the selected VM and to the selected PM through the communication module and iterate through the two unallocated VM clusters to allocate each of the plurality of the VMs to at least one of the plurality of the PMs and to convey the allocation to each of the plurality of the VMs and to at least one of the plurality of the PMs through the communication module.

According to some examples, the processor may be further configured to operate the allocation module to compute a residual capacity attribute of each of the plurality of PMs, identify a dominant resource requirement vector from the residual capacity attribute, and sort the plurality of PMs according to the dominant resource requirement vector. The processor may also be configured to operate the allocation module to select another VM from the plurality of VMs, where the another VM is sorted at a top position based on the size attribute associated with each of the plurality of VMs; select another PM from the plurality of PMs, where the another PM is sorted at a top position based on the dominant resource requirement vector; and allocate the another VM to the another PM. The at least two VM clusters may include a memory intensive VM cluster and a processor intensive VM cluster. The dominant resource requirement may include a memory resource attribute and a processor resource attribute.

According to further examples, the size attribute may include at least one from a set of a weighted resource demand value, a weighted resource capacity value, a weighted sum value of a normalized resource demand, a weighted sum value of a normalized resource capacity, a product of the normalized resource demand, and a product of the normalized resource capacity. The processor may be further configured to operate the allocation module to utilize a dot product scheme to determine the selected VM, where the dot product scheme allocates the selected VM to maximize a dot product value and to not exceed a capacity constraint of the selected PM. The processor may also be configured to operate the allocation module to utilize a norm-based greedy scheme to determine the selected VM, where the norm-based greedy scheme minimizes a weighted norm distance value between a resource request vector of the selected VM and a residual capacity vector of the selected PM to not exceed a capacity constraint of the selected PM.

According to some examples, a system that includes a plurality of virtual machines (VMs), a plurality of physical machines (PMs), and a controller communicatively coupled to the VMs and nits is described. The controller may be configured to allocate the VMs to the PMs through dominant resource assisted heuristics. As such, the controller may be configured to perform or cause to be performed cluster the plurality of VMs to at least two unallocated VM clusters according to a dominant resource requirement) associated with each of the plurality of VMs, order the plurality of VMs according to a size attribute associated with the dominant resource requirement, order the plurality of PMs according to a power efficiency attribute associated with each of the plurality of PMs, select one of the plurality of PMs, where the selected PM is ordered at a first identifiable position based on the power efficiency attribute, and select one of the plurality of VMs, where the selected VM is ordered at a second identifiable position based on the size attribute. The controller may also be configured to perform or cause to be performed activate a server that includes the selected PM, allocate the selected VM to the activated server, and iterate through the two unallocated VM clusters to allocate each of the plurality of the VMs to one or more servers.

According to other examples, the controller may be further configured to perform or cause to be performed compute a residual capacity attribute of the server and identify a dominant resource requirement vector from the residual capacity attribute. The controller may also be configured to perform or cause to be performed in response to determination that the residual capacity attribute is less than a particular threshold, discontinue allocation of the plurality of the VMs, and search the at least two unallocated VM clusters based cm an order of the dominant resource requirement vector to locate another VM to allocate to the selected PM, such that a capacity constraint of the selected PM is not exceeded. The first and second identifiable positions may comprise a top position in the ordered plurality of VMs and PMs.

According to some examples, a computer readable medium may store instructions to allocate virtual machines to physical machines through dominant resource assisted heuristics. The instructions may cause a method to be performed when executed, as described herein.

There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and or firmware would be possible in light of this disclosure.

The present disclosure is not to be limited in terms of the particular embodiments described in this application, which are intended as illustrations of various aspects. Many modifications and variations can be made without departing from its spirit and scope Functionally equivalent methods and apparatuses within the scope of the disclosure, in addition to those enumerated herein, will be possible from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more") the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will, be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the an. The various aspects and embodiments disclosed herein are for purposes of illustration and are not intended to be limiting, with the true scope and spirit being indicated by the following claims.

What is claimed is:

1. A method to allocate a virtual machine (VM) from a plurality of virtual machines (VMs) to a physical machine (PM) from a plurality of physical machines (PMs), the method comprising:
   sorting the plurality of VMs according to a size attribute associated with a dominant resource requirement, wherein:
   the dominant resource requirement includes a memory resource attribute and a processor resource attribute, and
   the dominant resource requirement corresponds to largest resource demand in the plurality of VMs;
   sorting the plurality of PMs according to a power efficiency attribute associated with each of the plurality of PMs;
   selecting one of the sorted plurality of PMs based on the power efficiency attribute;
   selecting one of the sorted plurality of VMs based on the size attribute;
   allocating the selected VM to the selected PM; and in response to a determination that a residual capacity attribute of the selected PM is less than a particular threshold, discontinuing allocation of the selected VM to the selected PM.

2. The method of claim 1, further comprising:
clustering the plurality of VMs to at least two unallocated VM clusters based on the dominant resource requirement; and
iterating through the at least two unallocated VM clusters to allocate each of the plurality of VMs to at least one of the plurality of PMs.

3. The method of claim 2, further comprising:
computing a total residual capacity attribute of the plurality of PMs;
identifying a dominant resource requirement vector from the total residual capacity attribute; and
sorting the plurality of PMs according to the dominant resource requirement vector.

4. The method of claim 3, wherein sorting the plurality of PMs according to the dominant resource requirement vector includes sorting the plurality of PMs according to a dominant resource requirement vector that represents one of a memory capacity and a processor capacity.

5. The method of claim 3, further comprising:
selecting another VM from the plurality of VMs, wherein the another VM is sorted at a top position based on the size attribute;
selecting another PM from the plurality of PMs, wherein the another PM is sorted at a top position based on the dominant resource requirement vector; and
allocating the another VM to the another PM.

6. The method of claim 2, wherein clustering the plurality of VMs to the at least two unallocated VM clusters includes clustering the plurality of VMs to at least two unallocated VM clusters that include a memory intensive VM cluster and a processor intensive VM cluster.

7. The method of claim 1, wherein allocating the selected VM to the selected PM includes:
utilizing a dot product scheme to determine the selected VM, wherein the dot product scheme allocates the selected VM to maximize a dot product value and to remain within a capacity constraint of the selected PM.

8. The method of claim 1, wherein allocating the selected VM to the selected PM includes:
utilizing a norm-based greedy scheme to determine the selected VM, wherein the norm-based greedy scheme minimizes a weighted norm distance value between a resource request vector of the selected VM and a residual capacity vector of the selected PM to remain within a capacity constraint of the selected PM.

9. A computer-readable non-transitory storage medium with instructions stored thereon to allocate the plurality of VMs to the plurality of PMs, wherein the instructions, in response to execution by a processor, cause the method of claim 1 to be performed.

10. An apparatus to allocate a virtual machine (VM) from a plurality of virtual machines (VMs) to a physical machine (PM) from a plurality of physical machines (PMs), the apparatus comprising:
a communication module configured to communicate with the plurality of VMs and the plurality of PMs at a datacenter;
an allocation module configured to manage an allocation of the plurality of VMs and the plurality of PMs; and
a processor coupled to the allocation module, wherein the processor is configured to operate the allocation module to:
cluster the plurality of VMs to at least two unallocated VM clusters based on a dominant resource requirement associated with each of the plurality of VMs;
sort the clustered plurality of VMs according to a size attribute associated with the dominant resource requirement, wherein the size attribute associated with the dominant resource requirement includes a memory resource attribute and a processor resource attribute, and wherein the dominant resource requirement corresponds to largest resource demand in the plurality of VMs;
sort the plurality of PMs according to a power efficiency attribute associated with each of the plurality of PMs;
select one of the sorted plurality of PMs based on the power efficiency attribute;
select one of the sorted plurality of VMs based on the size attribute;
allocate the selected VM to the selected PM and convey the allocation to the selected VM and to the selected PM through the communication module;
iterate through the two unallocated VM clusters to allocate each of the plurality of VMs to at least one of the plurality of PMs and convey the allocation to each of the plurality of VMs and to the at least one of the plurality of PMs through the communication module; and
in response to a determination that a residual capacity attribute of the at least one of the plurality of PMs is less than a particular threshold, discontinue allocation of the plurality of VMs to the at least one of the plurality of PMs.

11. The apparatus according to claim 10, wherein the processor is further configured to operate the allocation module to:
compute a residual capacity attribute of each of the plurality of PMs;
identify a dominant resource requirement vector from the residual capacity attribute; and
sort the plurality of PMs according to the dominant resource requirement vector.

12. The apparatus according to claim 11, wherein the processor is further configured to operate the allocation module to:
select another VM from the plurality of VMs, wherein the another VM is sorted at a top position based on the size attribute;
select another PM from the plurality of PMs, wherein the another PM is sorted at a top position based on the dominant resource requirement vector; and
allocate the another VM to the another PM.

13. The apparatus according to claim 10, wherein the at least two unallocated VM clusters include a memory intensive VM cluster and a processor intensive VM cluster.

14. The apparatus according to claim 10, wherein the size attribute includes at least one from a set of: a weighted resource demand value, a weighted resource capacity value, a weighted sum value of a normalized resource demand, a weighted sum value of a normalized resource capacity, a product of the normalized resource demand, and a product of the normalized resource capacity.

15. The apparatus according to claim 10, wherein the processor is configured to operate the allocation module to:
utilize a dot product scheme to determine the selected VM, wherein the dot product scheme allocates the selected VM to maximize a dot product value and to remain within a capacity constraint of the selected PM.

16. The apparatus according to claim 10, wherein the processor is configured to operate the allocation module to:
utilize a norm-based greedy scheme to determine the selected VM, wherein the norm-based greedy scheme minimizes a weighted norm distance value between a resource request vector of the selected VM and a residual capacity vector of the selected PM to remain within a capacity constraint of the selected PM.

17. A system, comprising:
a plurality of virtual machines (VMs);
a plurality of physical machines (PMs); and
a controller communicatively coupled to the plurality of VMs and the plurality of PMs and configured to allocate the plurality of VMs to the plurality of PMs through dominant resource assisted heuristics, wherein the controller is configured to perform or cause to be performed:
cluster the plurality of VMs to at least two unallocated VM clusters according to a dominant resource requirement associated with each of the plurality of VMs;
order the clustered plurality of VMs according to a size attribute associated with the dominant resource requirement, wherein the size attribute associated with the dominant resource requirement includes a memory resource attribute and a processor resource attribute, and wherein the dominant resource requirement corresponds to largest resource demand in the plurality of VMs;
order the plurality of PMs according to a power efficiency attribute associated with each of the plurality of PMs;
select one of the ordered plurality of PMs, wherein the selected PM is ordered at a first identifiable position based on the power efficiency attribute;
select one of the ordered plurality of VMs, wherein the selected VM is ordered at a second identifiable position based on the size attribute;
activate a server that includes the selected PM;
allocate the selected VM to the activated server;
iterate through the at least two unallocated VM clusters to allocate each of the plurality of VMs to one or more servers; and
in response to a determination that a residual capacity attribute of the one or more servers is less than a particular threshold, discontinue allocation of the plurality of VMs to the one or more servers.

18. The system according to claim 17, wherein the controller is further configured to perform or cause to be performed:
compute the residual capacity attribute of the one or more servers; and
identify a dominant resource requirement vector from the residual capacity attribute.

19. The system according to claim 18, wherein the controller is further configured to perform or cause to be performed:
search, based on an order of the dominant resource requirement vector, the at least two unallocated VM clusters to locate another VM to be allocated to the selected PM, such that the allocation of the another VM to the selected PM causes the selected PM to remain within a capacity constraint of the selected PM.

20. The system according to claim 18, wherein the first and second identifiable positions comprise a top position in the ordered plurality of VMs and the ordered plurality of PMs.

* * * * *